United States Patent
Buentello et al.

(10) Patent No.: US 11,446,949 B1
(45) Date of Patent: Sep. 20, 2022

(54) VIRTUAL TELLER CHECK SYSTEM

(71) Applicant: United Services Automobile Association (USAA), San Antonio, TX (US)

(72) Inventors: Andre Rene Buentello, San Antonio, TX (US); Mark Anthony Lopez, Oak Point, TX (US); Gregory Brian Meyer, San Antonio, TX (US); Ashley Raine Philbrick, San Antonio, TX (US); Garrett Rielly Rapport, San Antonio, TX (US); Jose L. Romero, Jr., San Antonio, TX (US); Michael Jay Szentes, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 16/579,304

(22) Filed: Sep. 23, 2019

Related U.S. Application Data

(60) Provisional application No. 62/789,349, filed on Jan. 7, 2019.

(51) Int. Cl.
| | |
|---|---|
| *B42D 1/00* | (2006.01) |
| *B42D 25/29* | (2014.01) |
| *G07D 7/00* | (2016.01) |
| *B42D 25/305* | (2014.01) |
| *G06Q 20/04* | (2012.01) |

(52) U.S. Cl.
CPC ........... *B42D 25/29* (2014.10); *B42D 25/305* (2014.10); *G06Q 20/042* (2013.01); *G07D 7/003* (2017.05)

(58) Field of Classification Search
CPC ....................................................... B42D 25/29
See application file for complete search history.

(56) References Cited

U.S. PATENT DOCUMENTS

| | | | |
|---|---|---|---|
| 6,363,164 B1 * | 3/2002 | Jones ..................... | G06Q 40/02 209/534 |
| 6,886,863 B1 * | 5/2005 | Mowry, Jr. ............ | B42D 25/29 235/494 |
| 8,374,963 B1 * | 2/2013 | Billman ................. | G06Q 40/02 705/44 |
| 9,004,353 B1 * | 4/2015 | Block .................. | G06Q 20/308 382/137 |
| 9,355,530 B1 * | 5/2016 | Block .................. | G06Q 20/405 |
| 10,423,938 B1 * | 9/2019 | Gaeta .................. | G06Q 20/042 |

(Continued)

OTHER PUBLICATIONS

"An algorithm to detect the forged part in an image" IEEE, 2016 (Year: 2016).*

(Continued)

*Primary Examiner* — Bruce I Ebersman
(74) *Attorney, Agent, or Firm* — Fletcher Yoder, P.C.

(57) ABSTRACT

Embodiments are described herein for a teller check that includes enhanced security features. In response to a request from a user, a teller check image is generated using a check template and that includes check information in fields of the check template. The teller check also includes a unique visible pattern or unique visible picture in the image that serves as an enhanced security feature. A captured image or received image of the teller check is able to be verified based on data extracted from the unique visible pattern or unique visible picture.

19 Claims, 9 Drawing Sheets

(56) References Cited

U.S. PATENT DOCUMENTS

| | | | | |
|---|---|---|---|---|
| 2002/0001393 A1* | 1/2002 | Jones | ............... | G06V 10/96 382/100 |
| 2002/0099652 A1* | 7/2002 | Herzen | ............ | G06Q 20/387 705/39 |
| 2005/0190914 A1* | 9/2005 | Chen | ............... | G09F 3/0297 380/201 |
| 2008/0285847 A1* | 11/2008 | Panwar | ............ | G06Q 10/08 382/165 |
| 2010/0027679 A1* | 2/2010 | Sunahara | ......... | H04N 19/64 375/240.24 |
| 2010/0057578 A1* | 3/2010 | Blair | ............... | G06Q 20/10 705/16 |
| 2011/0058225 A1* | 3/2011 | Lee | ............... | H04N 1/444 358/3.28 |
| 2013/0325661 A1* | 12/2013 | Collins, Jr. | ......... | G06Q 20/10 705/26.41 |
| 2014/0188726 A1* | 7/2014 | Vasantham | ......... | G06Q 20/322 705/44 |
| 2014/0325678 A1* | 10/2014 | Kotla | ............... | G06F 21/84 726/28 |
| 2015/0006382 A1* | 1/2015 | Scipioni | ......... | G06Q 20/3274 705/44 |
| 2015/0120564 A1* | 4/2015 | Smith | ............... | G06Q 20/042 705/45 |
| 2015/0356567 A1* | 12/2015 | Srinivasan | ......... | G06K 9/2054 705/44 |
| 2016/0275760 A1* | 9/2016 | Block | ............... | G07F 19/203 |

OTHER PUBLICATIONS

"Verifying the 'consistency' of shading patterns and 3-D structures", IEEE, 1993 (Year: 1993).*

* cited by examiner

VIRTUAL TELLER CHECK SYSTEM

CROSS REFERENCE TO RELATED APPLICATIONS

This application claims priority from and the benefit of U.S. Provisional Application Ser. No. 62/789,349, entitled "VIRTUAL TELLER CHECK SYSTEM," filed Jan. 7, 2019, which is hereby incorporated by reference in its entirety for all purposes.

BACKGROUND

The present disclosure relates generally to systems and methods for issuing and validating virtual teller checks.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Checks typically provide a safe and convenient method for an individual such as a payor to transfer funds to a payee. To use a check, the individual usually opens a checking account, or other similar account, at a financial institution and deposits funds, which are then available for later withdrawal. To transfer funds with a check, the payor usually designates a payee and an amount payable on the check. In addition, the payor often signs the check. Once the check has been signed, it is usually deemed negotiable, meaning the check may be validly transferred to the payee upon delivery. By signing and transferring the check to the payee, the payor authorizes funds to be withdrawn from the payor's account on behalf of the payee. Certain types of checks, such as teller checks (i.e., cashier's checks) are backed by the issuing bank. Accordingly, they may be preferred for transactions in which the payor/payee wish to have additional levels of protection.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
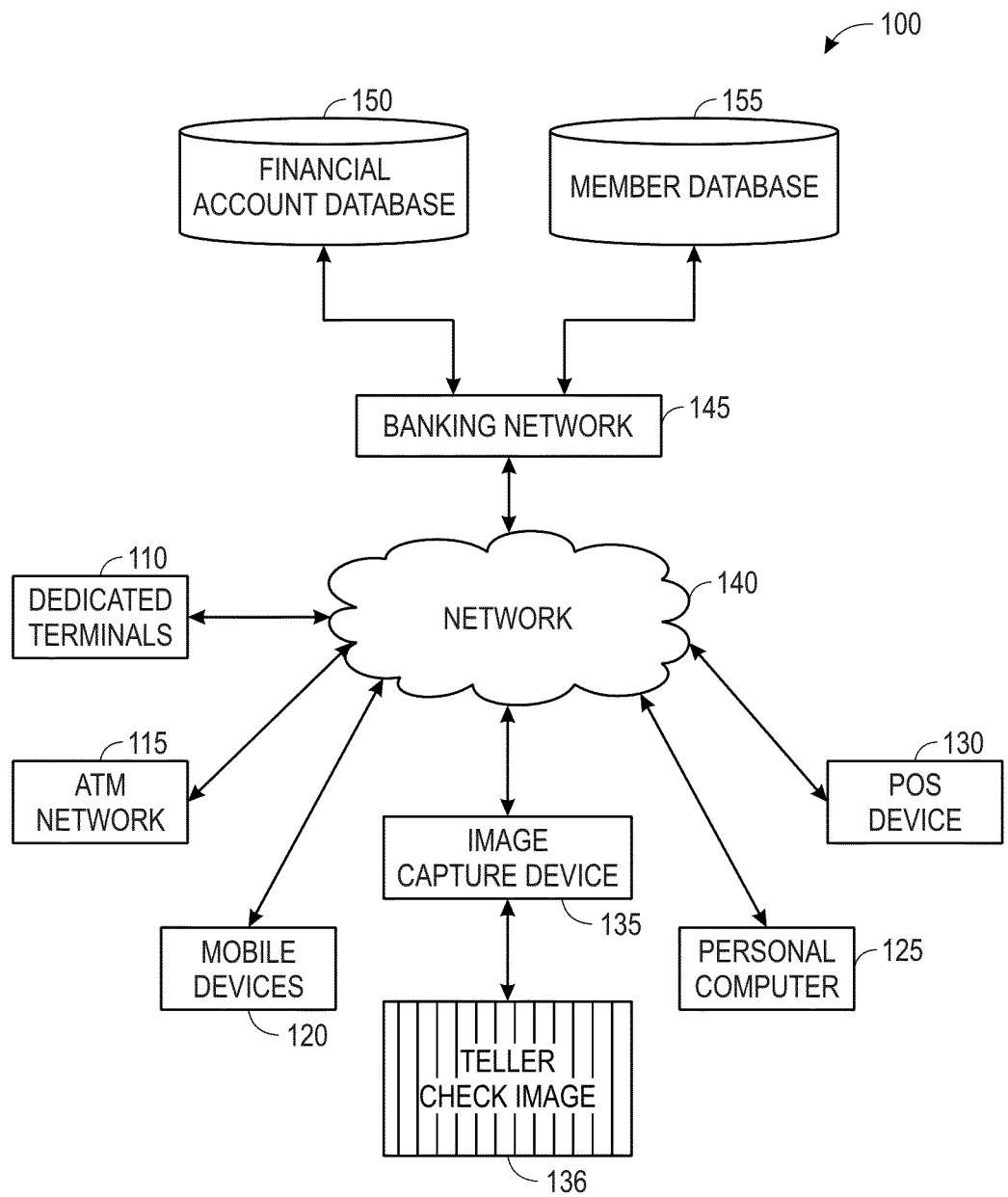
FIG. 1 is a block diagram of an implementation of a system in which example embodiments and aspects may be implemented.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Various embodiments of the present invention generally relate to systems and methods for generating a check (i.e., a cashier's check, a teller check) and/or an image of a check. More specifically, some embodiments of the present invention generate a teller check that includes a pattern or picture generated as part of the teller check and that functions to validate the check. Teller checks or cashier's check are notes guaranteed by a bank and may be used in transactions in which the payor and the payee do not have an established payment relationship (e.g., security deposits, insurance or legal settlements). Because teller checks are guaranteed by the issuing bank, it may be desirable to generate teller checks that include enhanced security features that discourage counterfeiting. While certain types of security features, such as specialized check paper stock, may be available for physical teller checks, such features cannot be used for virtual teller checks as well. Provided herein is a teller check system with enhanced security features that may be used in conjunction with virtual and/or physical teller checks. The enhanced security features may include a visible pattern or picture on the teller check that is rendered in a manner such that the pattern or picture may be extracted from an image of the teller check. In certain embodiments, a physical teller check or a virtual teller check may be provided. That is, in certain embodiments, the teller check is not printed and is provided electronically through all stages of the issuing to verification and funds distribution process.

The pattern or picture may be relatively difficult to duplicate, such that verification that a correct pattern or picture is on the teller check serves at the enhanced security feature. In one embodiment, the pattern or picture is generated based on a function that uses user data or check data as an input. In one embodiment, the pattern may seem random (e.g., random dots or swirls), but may be generated based on a seed by a random seed generator. That is, the pattern may be recreated only if the initial seed is known. The initial seed functions as a key to the pattern, and may be linked to the check-issuing institution or user (e.g., an account holder). The pattern or picture may be unique and issued on-demand in response to a request such that each teller check is associated with only one unique pattern or picture. In one embodiment, the unique pattern or picture encodes certain check information that may include account information, timestamp data, remitter data, location data, etc.

In contrast to barcodes or watermarks, which may be copied and duplicated even if a counterfeiter does not know how to reverse engineer the encoded information, the disclosed patterns and/or pictures may be relatively complex. That is, a change in orientation, scale, color, or other characteristic may be sufficient to render a teller check unverified. Further, in certain embodiments, the patterns and/or pictures may appear to be merely decorative, such that it would not be readily apparent that the features are enhanced security features. Further, having access to cancelled or old teller checks would not provide information as to a likely pattern on newly issued teller checks.

The pattern or picture may be used to validate the check and/or to provide information about one or more check validating characteristics, such as a valid time frame (e.g., to define a time period that during which the check is valid), an expected route from which the check was generated (generating bank information, bank routing information) and/or an expected return path to the issue bank (requesting entity or return path being associated with a designated payee of the check). Each individual pattern or picture may be unique and distinguishable from one another such that each individual pattern or picture is associated with a specific or with a single transaction and not with any other transaction. In an embodiment, certain features of the pattern or picture associated with the issuing bank may remain constant between checks while other features may change according to the individual information associated with each specific transaction to yield the unique pattern or picture. In one example, the information regarding the payee and the valid time frame may not be available until the request for the check is generated and the check is issued. Accordingly, the pattern or picture may be generated on demand.

In the following description, for the purposes of explanation, numerous specific details are set forth in order to provide a thorough understanding of embodiments of the present invention. It will be apparent, however, to one skilled in the art that embodiments of the present invention may be practiced without some of these specific details.

FIG. 1 illustrates an example of an operating environment 100 in which some embodiments of the present invention may be utilized. The embodiments of the present invention illustrated in FIG. 1 allow user interactions through various points of interaction such as, but not limited to, dedicated terminals 110 (e.g., public terminal or kiosk), ATM networks 115 (e.g., interbank ATM network and intrabank ATM networks), mobile devices 120 (e.g., mobile phone), personal computers 125, point of sale (POS) devices 130, and image capture devices 135 that may be used to capture an image of a teller check 136 that includes a pattern 138 or picture disposed thereon such that the pattern 138 or picture is able to be captured by the image capture device 135. These points of interaction can include mechanisms for capturing images (e.g., a camera) and connect through network 140 to banking network 145 and may run one or more applications or clients that allow a user to interact with the banking network (e.g., by submitting a digital image of a check for processing). Such applications may provide access to electronic image check processing systems and interfaces along with traditional banking functionality such as withdrawals, balance inquiries, deposits, transfers, etc. In one embodiment, an application (e.g., a mobile device app) may be self-verifying such that, when no network connectivity is available, verification of the virtual teller check is possible via stored or local features of the application.

Dedicated terminals 110 such as public terminals/kiosks may be computers available to the public and/or specially designed kiosks that interact with banking network 140. ATM networks 115 can be any set of ATMs in an interbank ATM network and/or intrabank ATM network. Mobile devices 120 may be cellular phones, smart phones (a smart phone being a cellular phone that has capabilities and features such as, but not limited to, internet access, a full keyboard, email access, Wi-Fi connection capabilities, BLUETOOTH connectivity, or any other functionality of a computer), tablet computers (a portable computer having a touch interface), netbooks, laptops possibly with a wireless connection (such as an 802.11a/b/g connection or mobile broadband connection, such as via a 3G or 4G wireless network). Personal computers 125 may be any computer (e.g., desktop computers, laptop computers, netbooks, tablet computers, Internet-enabled television devices, etc.) connected to network 140. POS devices 130 can be any device used as a checkout for a merchant. For example, POS device 130 can be a terminal located at the merchant, a computer-based interface such as a webpage or custom application, a telephone payment system, and others. Image capture device 130 can be any device (e.g., camera, scanner, etc.) capable of capturing an image and communicating with network 140.

Banking network 145 may include any number of membership organizations, banks, credit unions, or other financial institutions. In accordance with embodiments of the present invention, banking network 145 can use a variety of interaction methods, protocols, and systems. For example, banking network 145 can use any of the automated clearing house (ACH) networks. An ACH network may be operated by NACHA (previously referred to as the National Automated Clearing House Association). Another ACH network may be the Electronic Payments Network (EPN). These ACH networks may interact to settle ACH transactions involving a party that has a relationship with only NACHA's ACH network or only the EPN. Other banking networks, such as CIRRUS, NYCE, and PULSE may also be used.

As illustrated in FIG. 1, banking network 145 can be communicably coupled to one or more databases such as financial account database 150 and member database 155. These databases can have a variety of information that can be utilized by the check processing systems. For example, financial account database 155 includes account information for members of a financial institution. Member database 155 stores information about members (or customers) of a membership organization (or financial institution). For example, membership database 155 can include information such as employer, total balance of all accounts held at the membership organization, credit ratings, home ownership information, annual salary, length of membership, and/or other information. In some embodiments, these two databases can be integrated into one database. A computer system associated with a membership organization, a bank, a credit union, or other financial institution within banking network 145 may be able to access these (and other) databases for account information, customer information, and other stored information.

Figure 2:
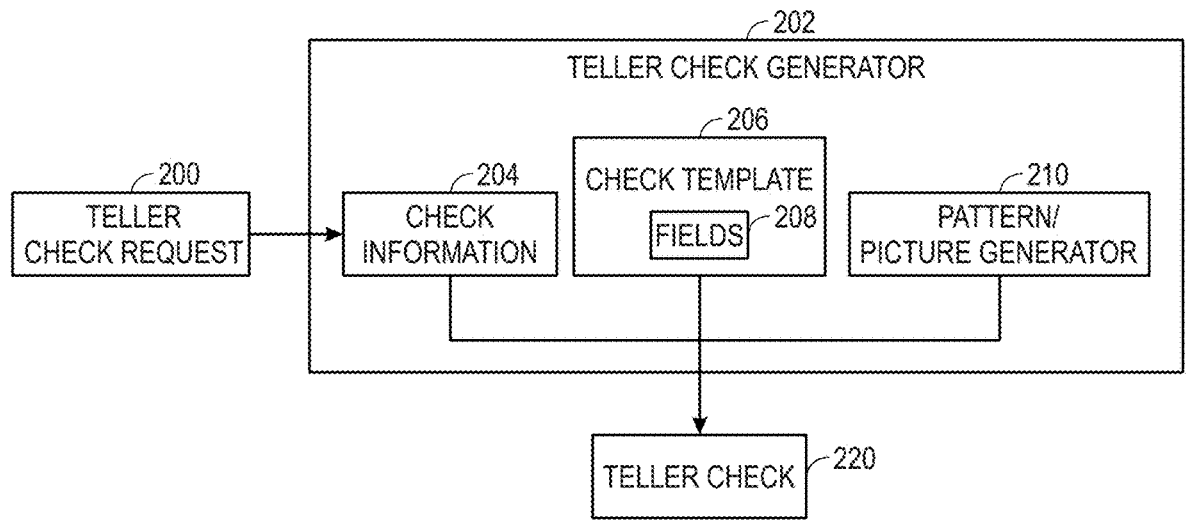
FIG. 2 is a block diagram of an implementation of a system in which example embodiments and aspects may be implemented.

FIG. 2 depicts an example system that include a teller check generator 202 that generates a teller check 220. The teller check generator 202 may be implemented as a part of the system 100 (FIG. 1) in one or more of the devices coupled to the network 140. As shown in the example of FIG. 2, a teller check request 200 may be received by the system. The request may include check information 204, such as an amount of the check, the name of the payor, the name of the payee, the date, a timestamp, authorization and/or account verification information of the payor, etc. The check information 204 is specific to the request and may vary between individual requests. The teller check generator 202 may also store a check template 206 and individual fields 208 that are completed using check information 204 of the request. The teller check generator 202 also includes a pattern/picture generator 210 that operates to generate a pattern and/or picture based on the check information 204 of the request 202. The teller check 220, once generated, may be provided as a physical check (e.g., with the template and the unique pattern or picture printed on a carrier surface) or as an electronic (e.g., digital) check.

Figure 3:
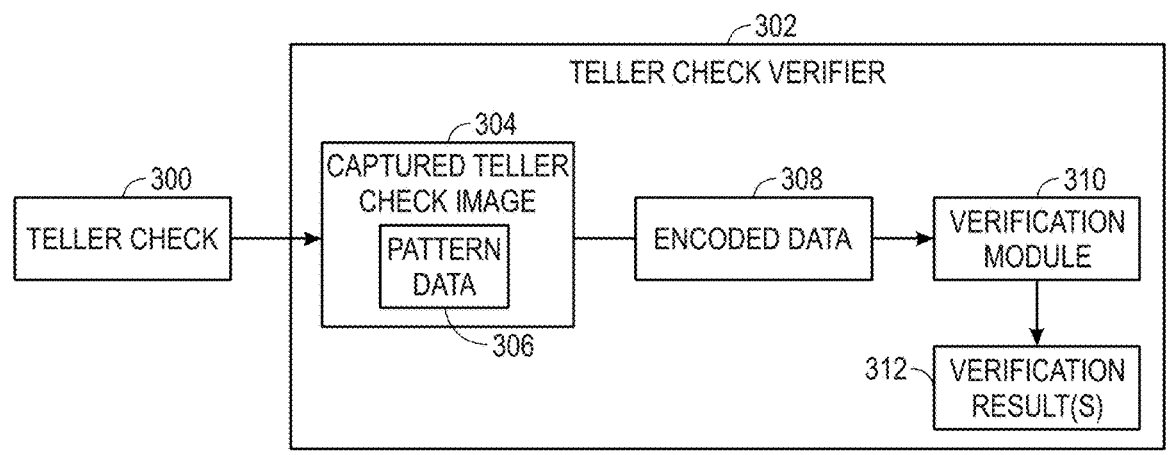
FIG. 3 is a block diagram of an implementation of a system in which example embodiments and aspects may be implemented.

Once generated, a teller check 300 may be provided to the payee and subsequently presented for verification via a teller check verifier 302, as shown in FIG. 3. The teller check verifier 3202 received a captured teller check image 304 of the teller check 300 that includes pattern data 306. In certain embodiments, the pattern data may be processed to extract encoded data 308 for teller check verification via a verification module 310, according to implementations of the present disclosure.

The encoded data 308 may be provided to the verification module 310 executing on the image capture device 135. Based on the encoded data 308, the verification module 310 may generate verification result(s) 312 indicating whether or not particular characteristic(s) of the pattern data 306 and/or the encoded data 308 are consistent with verification. In one example, the verification may include assessing whether the time frame data associated with the encoded data 308 is valid. If outside the time period, the teller check may be rejected. In another example, the verification may include assessing whether the teller check is being returned or routed to the issuing institution via an expected return path (whereby the expected path is obtained from the encoded data 308). If the return path includes potential violations, the teller check may be rejected.

In some implementations, a single device may be configured to perform operations of the teller check generator 202 (FIG. 2) and the teller check verifier 302 (FIG. 3). In other embodiments, these functionalities may be distributed between different devices. In some instances, such a device may be a portable and/or mobile computing device such as a smartphone, tablet computer, and so forth, and the device may include hardware and/or software components to perform operations for seal application, scanning, and verification.

Figure 4:
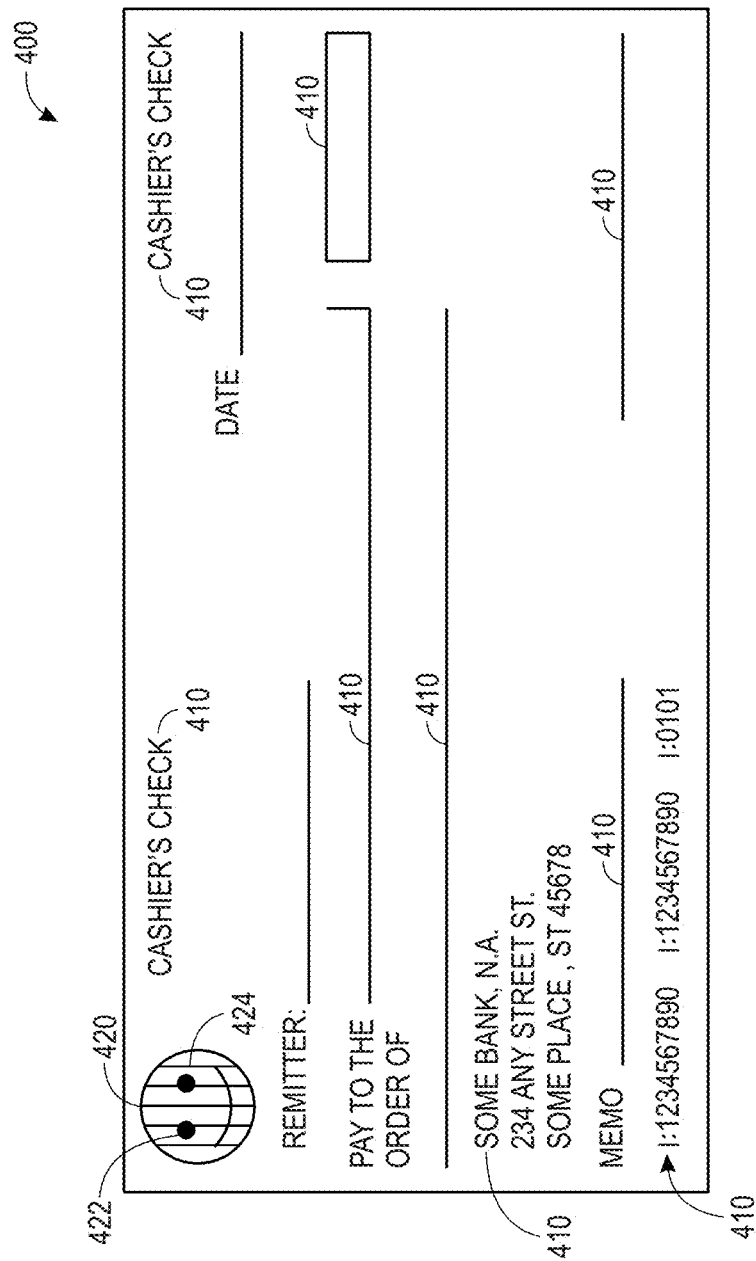
FIG. 4 is an example image of a teller check including a unique pattern or picture.

FIG. 4 illustrates an example of teller check 400 (or image thereof) with a visible picture 420 that can be used in accordance with one or more embodiments of the present invention. Check 400 illustrated in FIG. 4 may be generated by populating check information fields 410 of a check template with check information. Check information fields 410 may include check number, payee identifying section which has information such as a name, address, and phone number of the account owner, date line, payee field, amount block, amount line, bank identification section, memo line, signature line, and MICR code.

Figure 5:
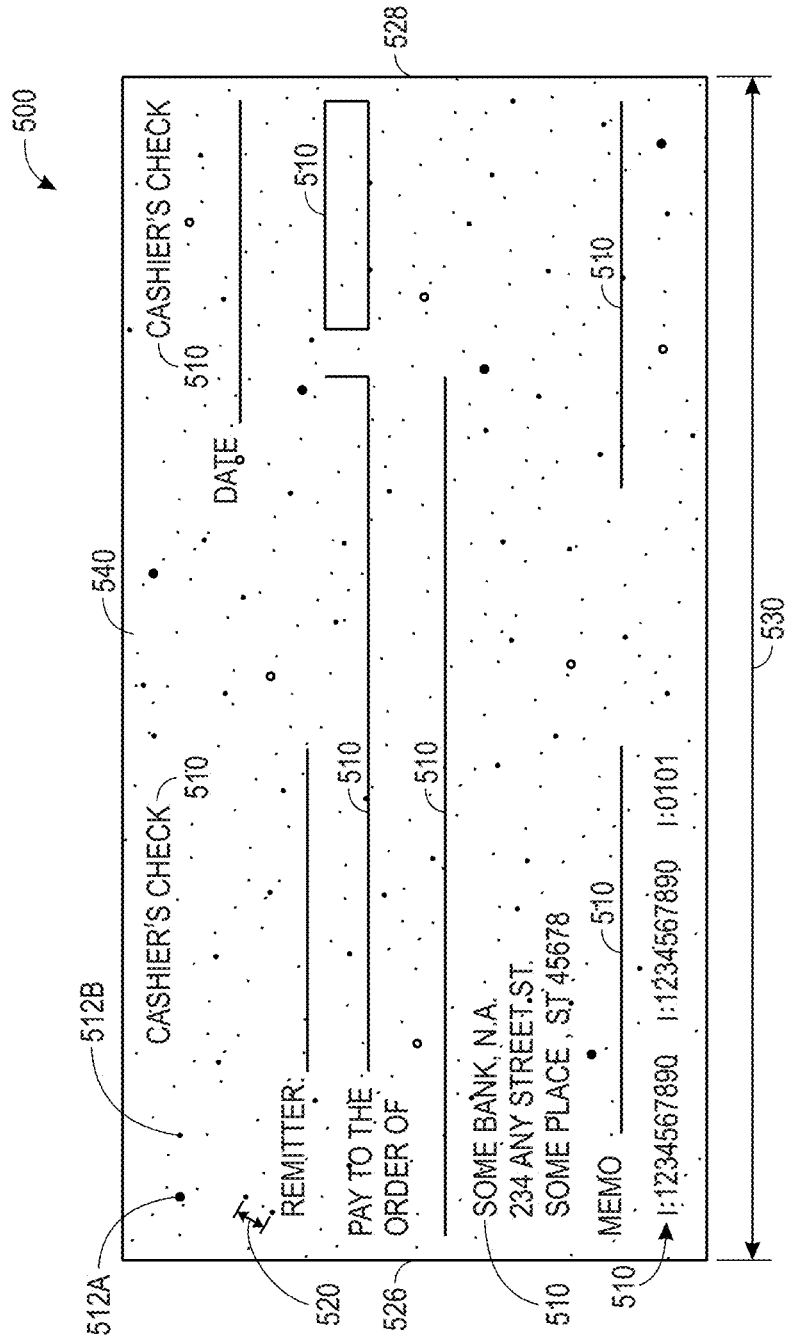
FIG. 5 is an example image of a teller check including a unique pattern or picture implemented as a random-seeming pattern of dots.

As provided herein, the visible picture 420 is visible to the image acquisition device 135. Accordingly, a visible picture 420 may be rendered to be captured by a camera operating in the visible spectrum. Further, the size and shape may be selected to be generally large enough to be visible to an observer. In the depicted example, the visible picture 420 includes picture features 422 (shown here as a face) as well as pattern features 424. The visible picture 420 may be any suitable picture (e.g., a representational image) or may be a pattern, as generally provided herein. In one embodiment, a user (i.e., account holder) may select a characteristic image that is generally associated with the user's account. The pattern features (e.g., fill or background) may change according to the check information and other information FIG. 5 is an example of a teller check 500 (or image thereof) that includes a distributed pattern 502. The pattern features are disposed or rendered on a surface or portion 540 of the teller check 500, around or overlapping with the check information fields 510. To a casual observer, the dots 512 of the pattern 502 may appear to be positioned randomly on the on the surface or portion 540. However, the pattern 502 may be generated by a pattern generator according to one or more pattern functions, such as a random seed generator function. The pattern generator may use the check template as a boundary input such that the pattern 502 is generated within the check boundaries. Further, the pattern may generally be distributed such that a spacing between two farthest dots 512 is at least 50% or at least 75% of a length 530 between the sides 526, 528 of the longest dimension. The depicted dot pattern 502 may be altered depending on the unique pattern to include fewer or more dots 512, different spacing 520 between adjacent dots 512, and dots 512$a$, 512$b$ of different sizes. In this manner, the pattern 502 may be rendered in a unique manner for different teller checks. As disclosed, the rendering of the pattern 502 may use the check information and/or payor information as an input to the pattern generation. Further, while the depicted pattern 502 is a dot pattern, the pattern may be a line pattern, a chevron pattern, a spiral pattern, a geometric pattern, etc.

Figure 6:
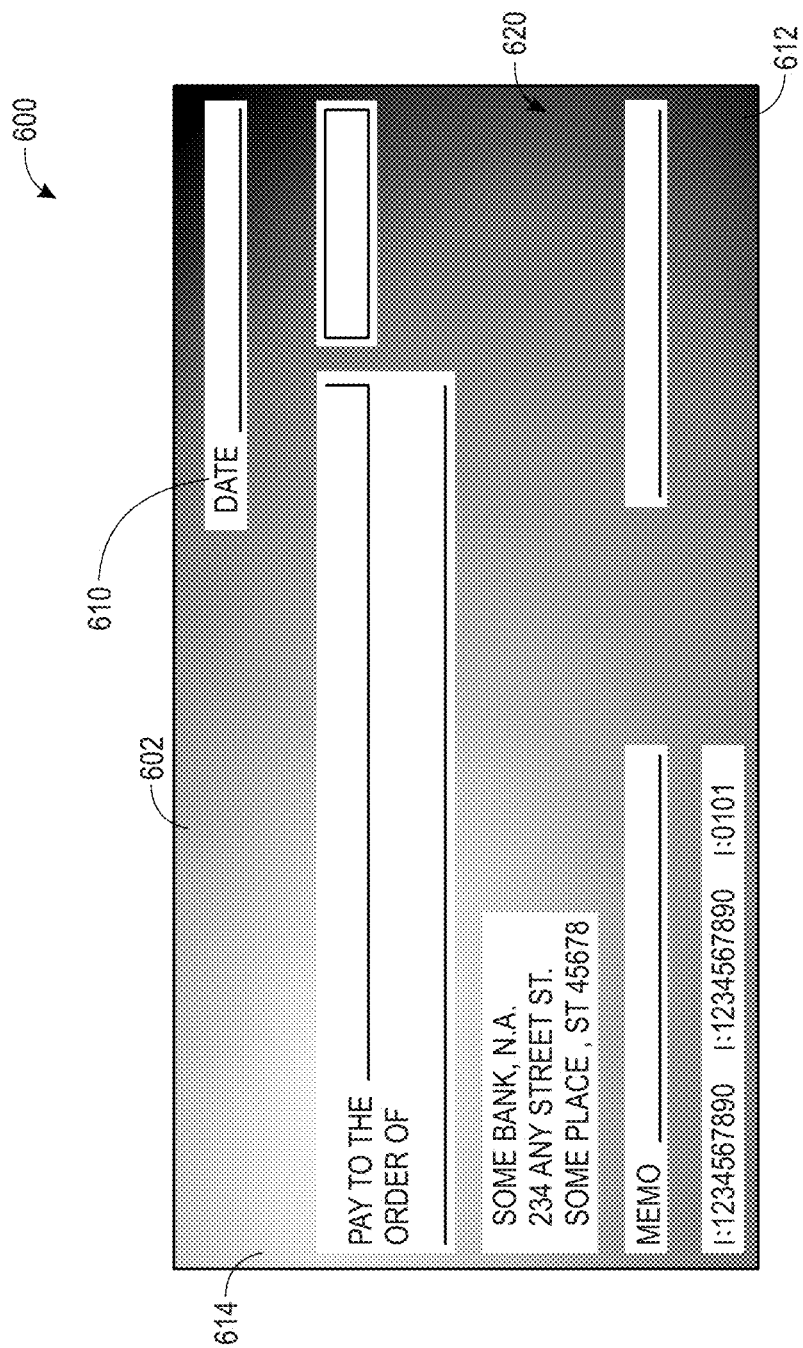
FIG. 6 is an example image of a teller check including a unique pattern or picture.

FIG. 6 is an example of a teller check 600 (or image thereof) that is generated with a pattern 602 that is distributed over most of a surface area of a surface 620 of the teller check 600 that includes the check information fields. To a casual observer, the pattern 602 may appear to be a decorative background image that is rendered in generally lighter color values than the check information to avoid causing visual clutter on the teller check. However, the background image may form a unique pattern such as a gradient pattern of darker areas 612 and lighter areas 614 that is generated based on inputs such as payor or check information.

Figure 7:
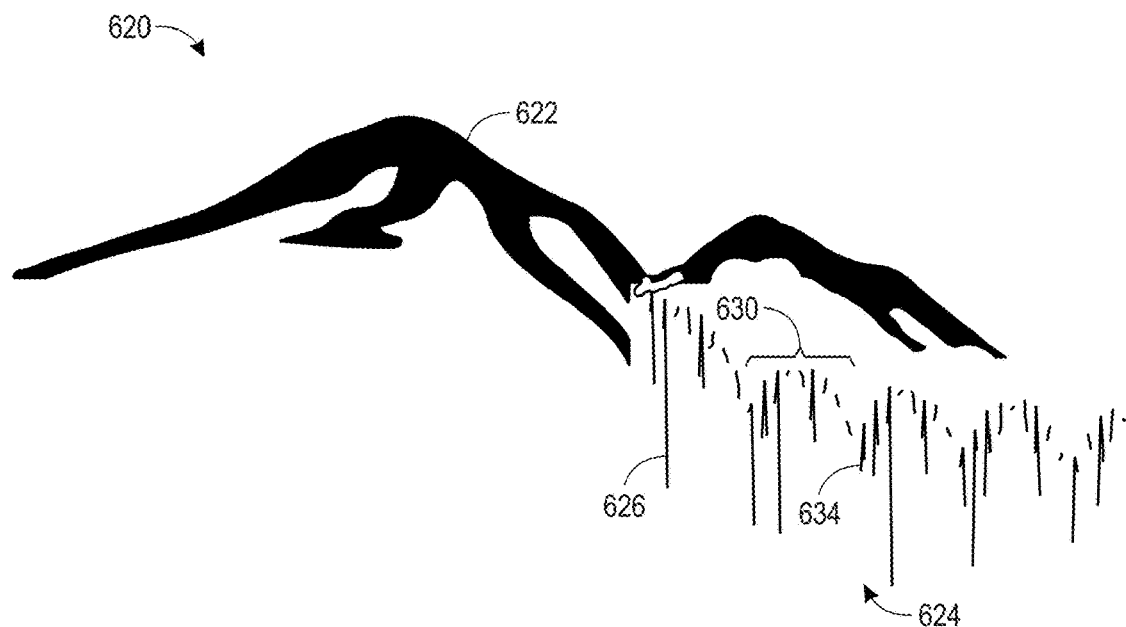
FIG. 7 is an example image of a teller check including a unique pattern or picture.
Figure 8:
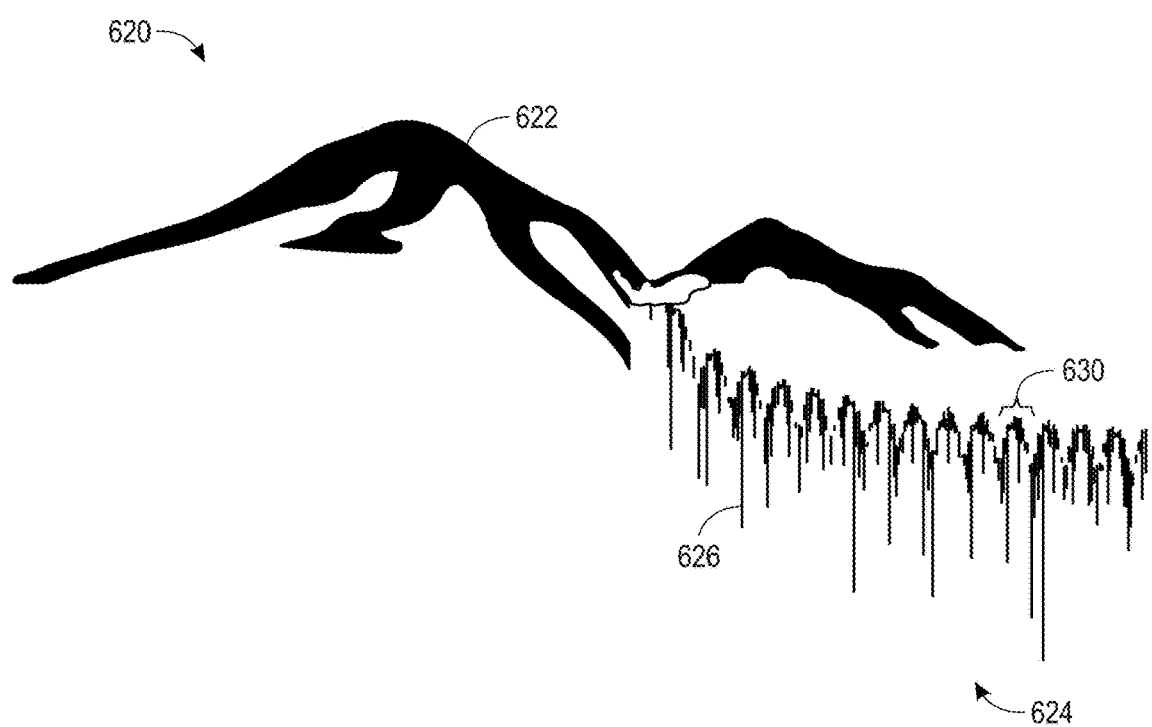
FIG. 8 is a variation of the example image of FIG. 7.
Figure 9:
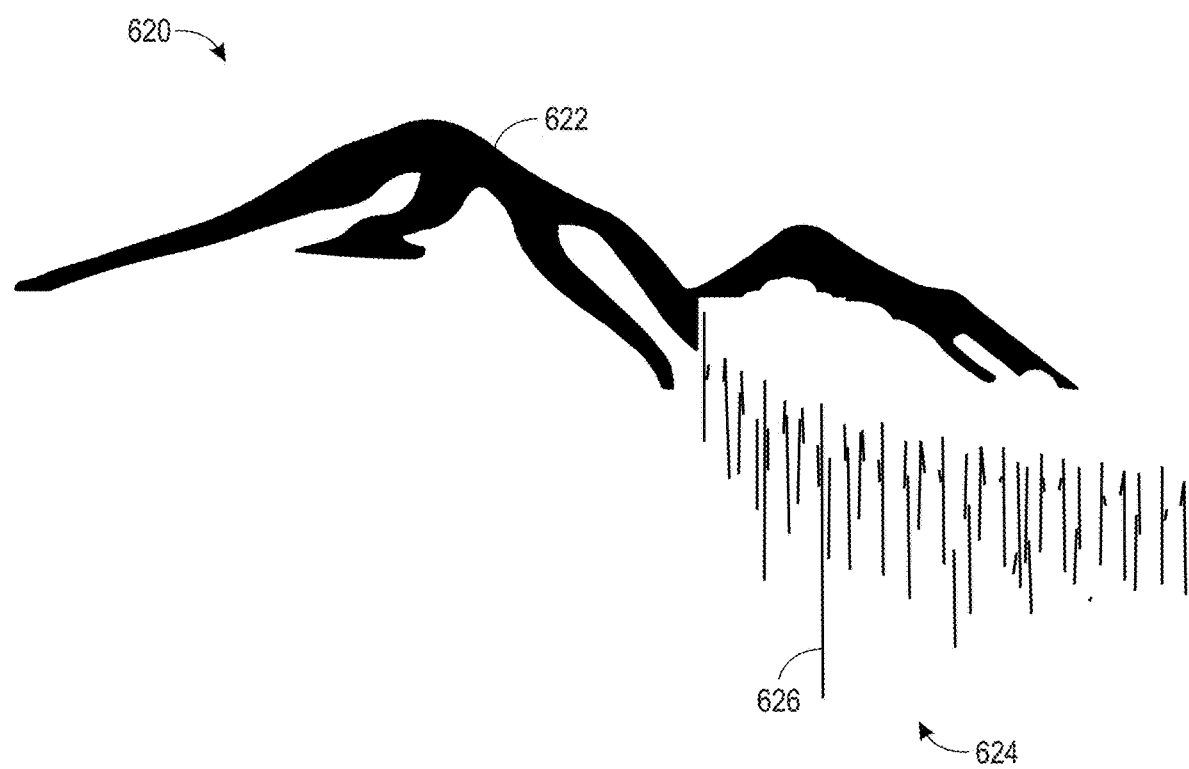
FIG. 9 is another variation of the example image of FIG. 7.

FIG. 7 is an example of a teller check image 620 that may be part of a teller check as provided herein, e.g., as a design feature or as part of a background of the teller check. In the depicted example, the teller check image 620 may include a base or constant portion 622. In one embodiment, the constant portion may be repeated between different teller checks and may serve as a registration feature that aligns verification logic (e.g., verification module 310, FIG. 3) to a variable portion 624 of the teller check image 620. In another example, a particular issuing institution may be associated with a particular constant portion 622 such that the constant portion 622 may be assessed (e.g., validated) as part of a verification logic. The variable portion 624 may be unique between different teller checks and distinguishable. In the depicted example, the variable portion 624 includes elongated variable length features 626 that are distributed in groups 630 that may vary between one another. The variable length features 626 may be grouped in variable numbers and lengths. Further, the packing of the groups 630 may vary, as seen in FIG. 8, which depicts more tightly packed groups 630 such that the overall number of variable length features 626 is greater relative to FIG. 7. FIG. 9 shows a variation in which the variable length features may not be in groups 630. The information may be encoded by assessing a number of variable length features 626, an average length of variable length features 626, or by pattern matching the overall variable portion 624. Further, the variable length features 626 may include additional complexity, such as split ends 634, hooked ends, curves, angles, or other features. As discussed, the complexity may permit representation of a number of separate data elements, such as an expected generation path, and expected return path, a valid time frame for the teller check, a payee, a payor, a check amount, etc. The data elements may be associated with an individual pattern or picture such that each image represents a single transaction and its associated data elements. FIGS. 7-9 may represent different images 620 associated with different transactions.

Figure 10:
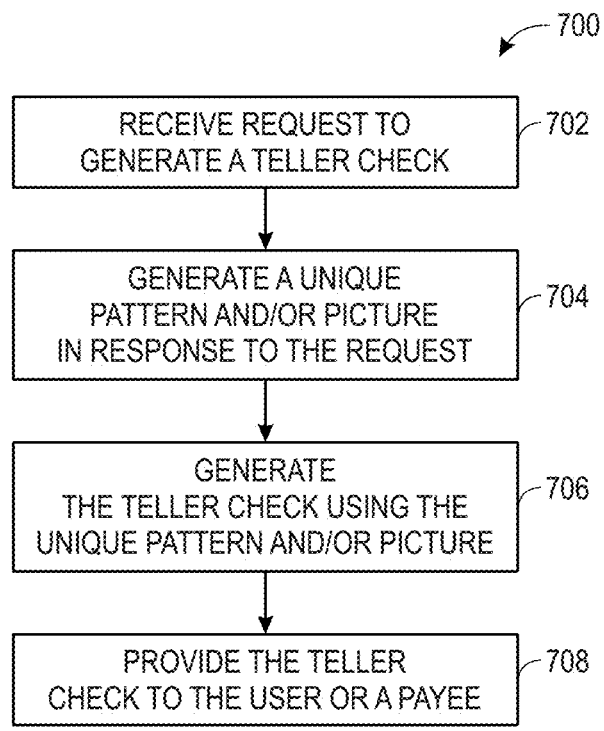
FIG. 10 is an operational flow of an implementation of a method that may be used to generate a teller check.

FIG. 10 depicts a flow diagram of an example process 700 for generating a teller check, according to implementations of the present disclosure. Operations of the process 700 may be performed by one or more elements of the system 100 (FIG. 1) operating the teller check generator 202 (FIG. 2). At 702, the system 100 receives a request to generate a teller check. The request may be provided, for example, via a mobile device 120, personal computer 124, dedicated terminal 110, etc. The request includes information specific to the payor of the teller check, such as the payor's user account information, balance, identification information, time and date and amount of request, and payee information. In addition to the check information specific to the request, the teller check also may include certain information that does not change between teller checks (institution name) and information that updates between checks (check number). At 704, a unique pattern or picture is generated in response to the request. In one embodiment, the unique pattern or picture may be generated using the check information and/or template information from the institution as an input to the pattern generation function. Once generated, the unique pattern or picture, together with the check information and the template information, may be used to generate the teller check (physical or virtual) at 706. The generated teller check may be provided to the user or a payee at 708.

Figure 11:
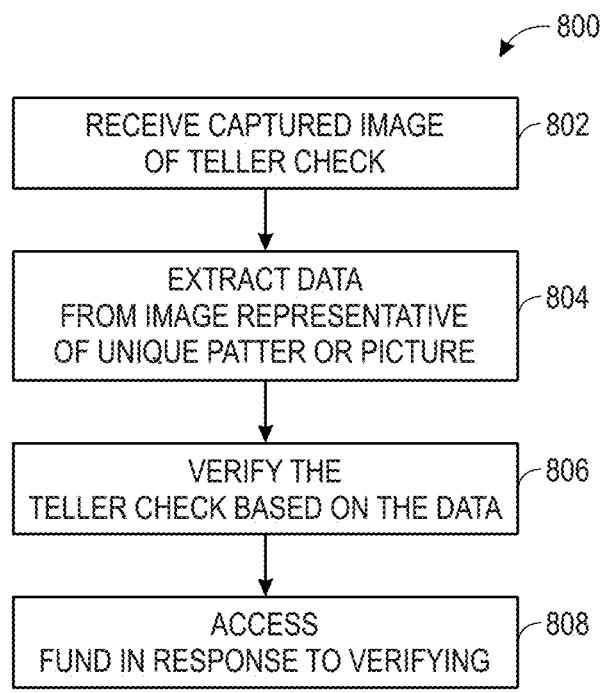
FIG. 11 is an operational flow of another implementation of a method that may be used to validate a teller check.

FIG. 11 is an operational flow of an implementation of a method 800 that may be used to verify a check. The payee may open a communication pathway with the teller check issuing institution or with their own bank, which in turn may initiate with contact the issuing institution to access the check funds. The communication may be initiated by logging into a website of the institution, for example, or by interacting with an application on a mobile device. There may be several ways in which a communication pathway may be established, including, but not limited to, an Internet connection via a website of the institution. The user may access the website and log into the website using credentials, such as, but not limited to, a username and a password. At 802, a digital or electronic image of the check may be received. There may be several ways in which to create a digital image of the check, including, but not limited to, a scanner, a digital camera, and/or a personal computer (PC). The user may place the check on a background and use the scanner, camera, or other imaging device to create a digital image comprising an image of the check and background. In an implementation, the user may scan or otherwise create a digital image file comprising the front side of the check and the back side of the check.

In an implementation, the user may use a template (e.g., provided by the institution) to arrange the check for scanning. In this manner, the image may comprise the check image in a predetermined position or arrangement that may be easier for the user computing device and/or the institution to identify and/or process.

Alternatively, the user may insert the check into a holder (e.g., provided by the institution). The check may be inserted in the holder in a predetermined position or manner. For example, the check or features of the check such as one or more corners of the check, the signature line, the MICR (magnetic ink character recognition) line, etc., may be aligned with respect to one or more markings or indicators on the holder. It is contemplated that different holders may be used for the front side of the check and for the back side of the check. The positioning or alignment may allow for more efficient processing of the check by the user computing device and/or the institution.

At 804, the image may be processed to extract data indicative of a unique pattern or picture. Processing of the digital image file may also include retrieving check information from the check. The financial information may comprise the MICR number, the routing number, an amount, etc. Any known image processing technology may be used, such as edge detection, filtering to remove imagery except the check image or check data in the received digital image file, image sharpening, and technologies to distinguish between the front and the back sides of the check. The institution may identify and/or remove at least a portion of data that is extraneous to the check, such as background data.

After retrieving the check information from the check in an electronic data representation form, the institution may determine whether the financial information such as the amount payable to the user, the account associated with the user to deposit funds, an account associated with a payor to debit funds, and an institution associated with the payor, etc., is valid at 806 based on an alignment between extracted data from the unique pattern or picture and the check information. For example, the extracted data may be indicative of a particular issuing institution and/or of a particular user account. Based on an alignment or match between the extracted data and the check information, the teller check is verified. For example, the institution may include electronic devices such as computers, servers, databases, or the like that may be in communication with each other. The electronic devices may receive an electronic data representation and may perform the teller check verification (see FIG. 3). For example, the electronic devices may determine whether the account number, amount payable, or the like may be readable such that they may be parsed and processed by the institution to credit an account associated with the payee.

If the teller check is determined to be valid, the electronic data representation may be processed by the institution, thereby freezing and/or accessing funds of the payor and depositing the money in the payee's account. If the teller check is determined to be invalid, then the payee may be advised. For example, the institution may transmit an email, a web message, an instant message, or the like to the user indicating that the financial information associated with the electronic data representation may be invalid.

Figure 12:
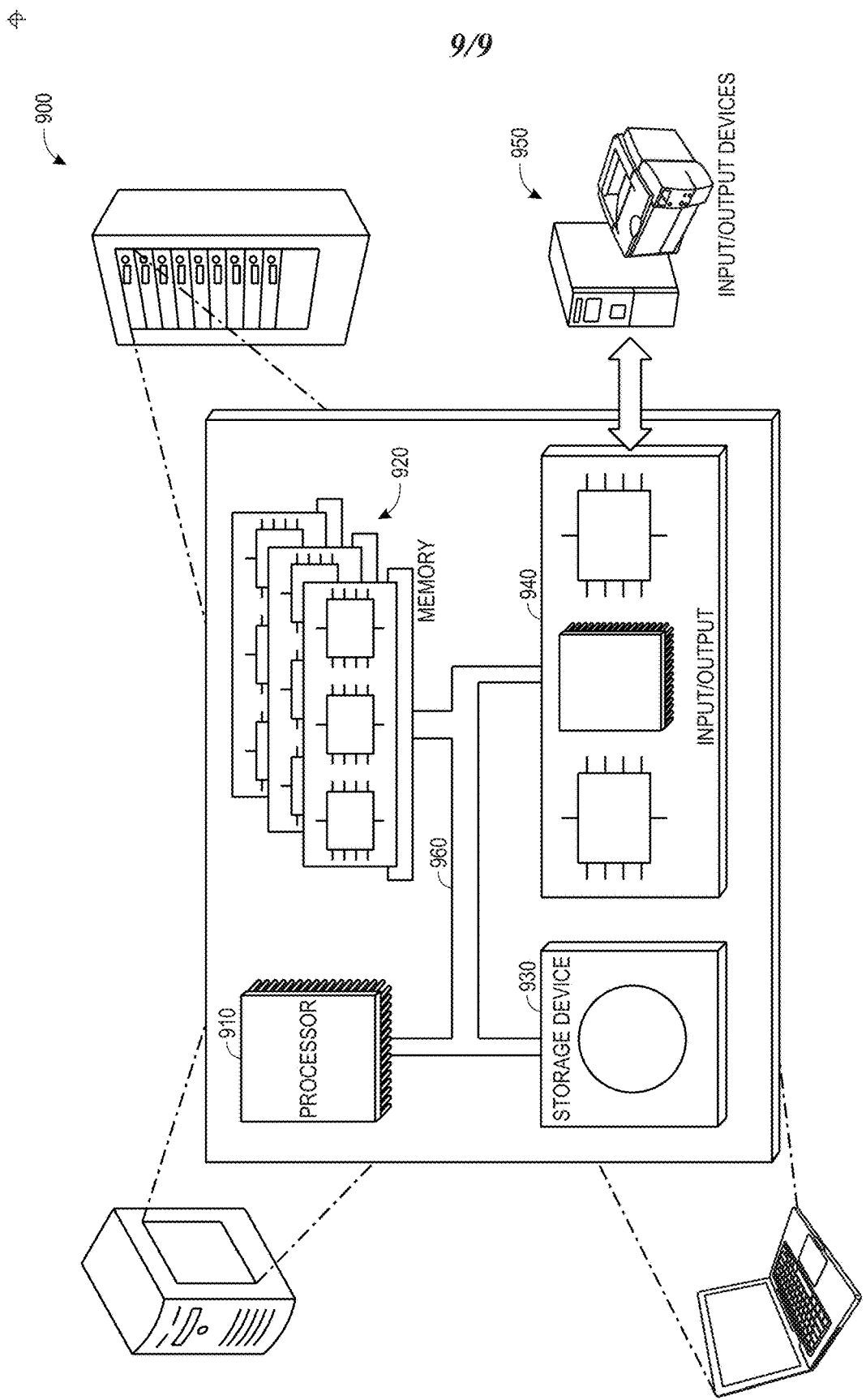
FIG. 12 is a block diagram of an example computing environment in which example embodiments and aspects may be implemented.

FIG. 12 depicts an example computing system, according to implementations of the present disclosure. The system 900 may be used for one or more of the operations described with respect to the various implementations discussed herein. For example, the system 900 may be included, at least in part, in one or more of the teller check generator 202, the teller check verifier 302, or other components of the system 100 or other computing device(s) described herein. The system 900 may include one or more processors 910, a memory 920, one or more storage devices 930, and one or more input/output (I/O) devices 950 controllable through one or more I/O interfaces 940. The various components 910, 920, 930, 940, or 950 may be interconnected through at least one system bus 960, which may enable the transfer of data between the various modules and components of the system 900.

The processor(s) 910 may be configured to process instructions for execution within the system 900. The processor(s) 910 may include single-threaded processor(s), multi-threaded processor(s), or both. The processor(s) 910 may be configured to process instructions stored in the memory 920 or on the storage device(s) 930. The processor(s) 910 may include hardware-based processor(s) each including one or more cores. The processor(s) 910 may include general purpose processor(s), special purpose processor(s), or both.

The memory 920 may store information within the system 900. In some implementations, the memory 920 includes one or more computer-readable media. The memory 920 may include any suitable number of volatile memory units and/or non-volatile memory units. The memory 920 may include read-only memory, random access memory, or both. In some examples, the memory 920 may be employed as active or physical memory by one or more executing software modules.

The storage device(s) 930 may be configured to provide (e.g., persistent) mass storage for the system 900. In some implementations, the storage device(s) 930 may include one or more computer-readable media. For example, the storage device(s) 930 may include a floppy disk device, a hard disk device, an optical disk device, or a tape device. The storage device(s) 930 may include read-only memory, random access memory, or both. The storage device(s) 930 may include one or more of an internal hard drive, an external hard drive, or a removable drive.

One or both of the memory 920 or the storage device(s) 930 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 900. In some implementations, the CRSM may include a data store that provides storage of computer-readable instructions or other information in a non-transitory format. The CRSM may be incorporated into the system 900 or may be external with respect to the system 900. The CRSM may include read-only memory, random access memory, or both. One or more CRSM suitable for tangibly embodying computer program instructions and data may include any suitable type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 910 and the memory 920 may be supplemented by, or incorporated into, one or more application-specific integrated circuits (ASICs).

The system 900 may include one or more I/O devices 950. The I/O device(s) 950 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 950 may also include one or more output devices such as a display, LED(s), an audio output device (e.g., a speaker), a printer, a haptic output device, and so forth. The I/O device(s) 950 may be physically incorporated in one or more computing devices of the system 900, or may be external with respect to one or more computing devices of the system 900.

The system 900 may include one or more I/O interfaces 940 to enable components or modules of the system 900 to control, interface with, or otherwise communicate with the I/O device(s) 950. The I/O interface(s) 940 may enable information to be transferred in or out of the system 900, or between components of the system 900, through serial communication, parallel communication, or other types of communication. For example, the I/O interface(s) 940 may comply with a version of the RS-232 standard for serial ports, or with a version of the IEEE 1284 standard for parallel ports. As another example, the I/O interface(s) 940 may be configured to provide a connection over Universal Serial Bus (USB) or Ethernet. In some examples, the I/O interface(s) 940 may be configured to provide a serial connection that is compliant with a version of the IEEE 1394 standard.

The I/O interface(s) 940 may also include one or more network interfaces (e.g., the network interface(s) 210) that enable communications between computing devices in the system 900, and/or between the system 900 and other network-connected computing systems. The network interface(s) may include one or more network interface controllers (NICs) or other types of transceiver devices configured to send and receive communications over one or more networks using any suitable network protocol.

Computing devices of the system 900 may communicate with one another, or with other computing devices, using one or more networks. Such networks may include public networks such as the internet, private networks such as an institutional or personal intranet, or any combination of private and public networks. The networks may include any suitable type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 900 may include one or more computing devices of any suitable type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and/or processor(s) of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

While only certain features of the disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A computer-implemented method, comprising:
   receiving, via a teller check generator processor of a teller check generator, a request from a user to issue a teller check for a transaction, wherein the request comprises check information;
   storing, via the teller check generator processor, the check information in memory as stored check information;
   electronically generating, via the teller check generator processor, an image of the teller check using a check template, wherein the image comprises the check information in fields of the check template;
   encoding, via the teller check generator processor, the check information into a unique visible pattern or a unique visible picture;
   incorporating, via the teller check generator processor, the unique visible pattern or the unique visible picture into the image, wherein the unique visible pattern or the unique visible picture comprises a constant portion and a variable portion, wherein the unique visible pattern or the unique visible picture extends across a threshold area of the check template, and wherein the variable portion comprises encoded data corresponding to the check information;
   sending, via a communication interface of the teller check generator, the image incorporating the unique visible pattern or the unique visible picture along a first communication pathway to a user computing device;
   causing, via a processor of the user computing device, the user computing device to display the image of the teller check comprising the unique visible pattern or the unique visible picture;
   receiving, via a teller check verifier processor of a teller check verifier, the image of the teller check comprising the unique visible pattern or the unique visible picture;
   extracting, via the teller check verifier processor, the encoded data corresponding to the check information from the variable portion of the unique visible pattern or the unique visible picture;
   retrieving, via the teller check verifier processor, the stored check information from the memory;
   comparing, via the teller check verifier processor, the encoded data with the stored check information;
   verifying, via the teller check verifier processor, the image of the teller check for the transaction based on the encoded data matching the stored check information; and
   delivering, via a communication interface of the teller check verifier, funds associated with the user to a recipient for the transaction along a second communication pathway in response to verifying the image of the teller check.

2. The method of claim 1, wherein the image of the teller check is a digital image.

3. The method of claim 1, comprising providing the image of the teller check to the user, wherein the image is a physical check.

4. The method of claim 1, wherein the unique visible pattern or the unique visible picture comprises a background image of the check template.

5. The method of claim 1, wherein the unique visible pattern or the unique visible picture is generated on demand in response to receiving the request.

6. The method of claim 1, wherein the unique visible pattern or the unique visible picture is generated using a random seed generator.

7. The method of claim 1, comprising:
   accessing, via the teller check generator processor, an account associated with the user;
   encoding, via the teller check generator processor, account information from the account; and
   incorporating, via the teller check generator processor, the account information into the unique visible pattern or the unique visible picture.

8. The method of claim 7, comprising:
   receiving, via the teller check verifier processor, the image of the teller check;
   extracting, via the teller check verifier processor, the unique visible pattern or the unique visible picture from the image; and
   accessing, via the teller check verifier processor, the account information from the extracted unique visible pattern or the extracted unique visible picture.

9. The method of claim 1, comprising encoding, via the teller check generator processor, validation information of the teller check using the unique visible pattern or the unique visible picture.

10. The method of claim 9, wherein the validation information comprises a timestamp, issuing location data, or a combination thereof.

11. The method of claim 1, wherein generating the image comprises rendering, via the teller check generator processor, the unique visible pattern or the unique visible picture in a lighter color value than the check information.

12. The method of claim 1, wherein the unique visible pattern or the unique visible picture extends across the threshold area of the check template such that a distance between edges of the unique visible pattern or the unique visible picture comprises at least 50% of a longest dimension of the check template in the image.

13. The method of claim 1, wherein the constant portion comprises information associated with an issuing institution of the teller check that is constant between different teller checks.

14. A non-transitory, computer-readable medium storing instructions that, when executed by at least one processor, cause the at least one processor to perform operations comprising:
   receiving, via a teller check generator processor of a teller check generator, a request from a user to generate a teller check, wherein the request comprises check information;
   storing, via the teller check generator processor, the check information in memory as stored check information;
   electronically generating, via the teller check generator processor, a unique pattern in response to receiving the request by encoding the check information into the unique pattern, wherein the unique pattern comprises a constant portion and a variable portion, and wherein the variable portion comprises encoded data corresponding to the check information;
   incorporating, via the teller check generator processor, the unique pattern into an image of the teller check;
   sending, via a communication interface of the teller check generator, the image of the teller check incorporating the unique pattern along a first communication pathway to the user;
   printing, via a printer, the image of the teller check incorporating the unique pattern onto a tangible version of the teller check such that the unique pattern extends across a threshold area of the teller check and is visible to the user;

capturing, via a user input device, a captured image of the tangible version of the teller check;

receiving, via a teller check verifier processor of a teller check verifier, the captured image of the teller check from the user input device, the captured image comprising the encoded data from the variable portion representative of the check information;

extracting, via the teller check verifier processor, the encoded data representative of the check information from the variable portion of the captured image;

retrieving, via the teller check verifier processor, the stored check information from the memory;

comparing, via the teller check verifier processor, the encoded data with the stored check information;

verifying, via the teller check verifier processor, the captured image of the teller check based on the encoded data matching the stored check information; and delivering, via a communication interface of the teller check verifier, funds associated with the user to a recipient along a second communication pathway in response to verifying the teller check.

15. The non-transitory, computer-readable medium of claim 14, comprising generating, via the teller check generator processor, the unique pattern using a random seed generator, wherein a seed used in the random seed generator is associated with the user or the teller check.

16. The non-transitory, computer-readable medium of claim 14, wherein extracting the encoded data via the teller check verifier processor comprises identifying features in the unique pattern and, based on the identified features, identifying the user or an institution securing the teller check.

17. The non-transitory, computer-readable medium of claim 16, wherein the features comprise one or more of a spacing between pattern elements or a size of one or more pattern elements.

18. A non-transitory, computer-readable medium storing instructions that, when executed by at least one processor, cause the at least one processor to perform operations comprising:

receiving, via a teller check generator processor of a teller check generator, a request from a user computing device to generate a teller check for a transaction, wherein the request comprises check information;

storing, via the teller check generator processor, the check information in memory as stored check information;

electronically generating, via the teller check generator processor, an image of the teller check using a check template, wherein the check information is used to populate the check template;

generating, via the teller check generator processor, a unique pattern or a unique picture by encoding the check information into the unique pattern or the unique picture, wherein the unique pattern or the unique picture comprises a constant portion and a variable portion, and wherein the variable portion comprises encoded data corresponding to the check information in response to receiving the request;

incorporating, via the teller check generator processor, the unique pattern or the unique picture into the image of the teller check such that the unique pattern or the unique picture extends across a threshold area of the check template;

providing, via a communication interface of the teller check generator, the image of the teller check comprising the unique pattern or the unique picture along a communication pathway to a recipient for the transaction;

extracting, via a teller check verifier processor of a teller check verifier, the encoded data corresponding to the check information from the variable portion of the unique pattern or the unique picture;

retrieving, via the teller check verifier processor, the stored check information from the memory;

comparing, via the teller check verifier processor, the encoded data with the stored check information;

verifying, via the teller check verifier processor, the image of the teller check based on the encoded data matching the stored check information; and delivering, via a communication interface of the teller check verifier, funds associated with the user to the recipient along the communication pathway in response to verifying the image of the teller check.

19. The non-transitory, computer-readable medium of claim 18, wherein the constant portion comprises a registration feature that is aligned to identify the check information of the variable portion as part of the extracting.

* * * * *